US006499700B1

(12) United States Patent
Schlosser et al.

(10) Patent No.: US 6,499,700 B1
(45) Date of Patent: Dec. 31, 2002

(54) ATTACHMENT DEVICE FOR A CRYOGENIC SATELLITE TANK

(75) Inventors: Christian Schlosser, Olching (DE); Heinz Voggenreiter, Munich (DE); Axel Runge, Ottobrunn (DE); Joachim Schupp, Munich (DE); Andreas Schuster, Alsfeld (DE)

(73) Assignee: EADS Deutschland GmbH, Munich (DE)

( * ) Notice: Subject to any disclaimer, the term of this patent is extended or adjusted under 35 U.S.C. 154(b) by 0 days.

(21) Appl. No.: 09/621,760

(22) Filed: Jul. 21, 2000

(30) Foreign Application Priority Data

Jul. 21, 1999 (DE) ........................................ 199 34 157

(51) Int. Cl.[7] .............................. B64G 1/40; F02K 9/60

(52) U.S. Cl. ....................................................... 244/172

(58) Field of Search ............................ 244/161, 158 R, 244/172; 403/404; 296/82.26, 100, 82.24, 86.24, 97.1

(56) References Cited

U.S. PATENT DOCUMENTS

| | | | | |
|---|---|---|---|---|
| 4,407,776 | A | * | 10/1983 | Suzuki |
| 4,549,717 | A | * | 10/1985 | Dewaegheneire |
| 5,160,233 | A | * | 11/1992 | McKinnis |
| 5,248,233 | A | * | 9/1993 | Webster |
| 5,535,815 | A | * | 7/1996 | Hyman |
| 6,126,115 | A | * | 10/2000 | Carrier et al. |
| 6,126,371 | A | * | 10/2000 | McCloskey |
| 6,131,858 | A | * | 10/2000 | Dethienne et al. |

FOREIGN PATENT DOCUMENTS

| | | | |
|---|---|---|---|
| DE | 4323510 | | 5/1955 |
| DE | 4331460 | | 5/1995 |
| EP | 584697 | * | 8/1992 |
| EP | 0584679 | | 2/1996 |
| JP | 469491 | | 3/1992 |
| WO | 9109246 | | 6/1991 |

* cited by examiner

*Primary Examiner*—Charles T. Jordan
*Assistant Examiner*—T. Dinh
(74) *Attorney, Agent, or Firm*—Ladas & Parry

(57) ABSTRACT

The present invention relates to an attachment device for a cryogenic satellite tank. In order to achieve adequate rigidity in such an attachment device while reducing the thermal conductivity and at the same time ensuring simple construction which is easy to realize from a technical point of view, so-called shape memory alloy elements are used. Due to suitable arrangement or interaction between a support element (1) and a connecting component (2) or a thermally controlled connection arranged in the support element (1) it is achieved that after the launch of the rocket, the SMA element automatically expands significantly in the cold space environment as a result of phase transformation, thus reducing surface pressure at respective connection points of the attachment device, and partly disengaging the contact. Consequently, the thermal flow via these connection points is reduced or completely eliminated.

18 Claims, 5 Drawing Sheets

ATTACHMENT DEVICE FOR A CRYOGENIC SATELLITE TANK

FIELD OF THE INVENTION

The invention relates to an attachment device for a cryogenic satellite tank.

BACKGROUND

The service life of a satellite equipped with a cryogenic tank is to a large extent determined by heat transfer or thermal flow to the cryogenic tank, said flow emanating from the warmer satellite by the attachment device of the tank to the tank. This thermal flow results in an increase in pressure in the tank, which is compensated by partial discharge of the tank's contents.

As a result of the thermal flow via the attachment device, the achievable cooling temperatures are limited both for active and passive cooling, and the coolant consumption is increased as a result of the thermal flow.

The substantial mechanical loads occurring during launch of the satellite mitigate against adequate reduction in material cross sections of the attachment device, so that optimized design of the attachment device from the point of view of material cross sections cannot adequately reduce the thermal flow via the attachment device, even if materials having low thermal conductivity are used.

EP 0 584 697 B1 discloses a deice for holding a storage container by means of tensile stress within an object, particularly in space technology. This device ensures a stable connection between the storage container and the object during the launch phase, and at comparatively low mechanical loads, ensures that the holding device between the storage container and the object is of low thermal conductivity. This is achieved by use of a shape memory alloy (SMA).

SUMMARY OF THE INVENTION

It is an object of the invention to provide an attachment device for a cryogenic satellite tank which has reduced thermal conductivity and provides adequate rigidity and strength, while being simple in design and easy to produce from a technical point of view, is not prone to malfunction and thus has low maintenance requirements.

The thermal conductivity between two objects engaged against each other is substantially determined by their surface pressure and contact area. This experience is taken into account in many solutions proposed by the invention. The attachment devices according to the invention advantageously use shape memory alloy elements, which, following the rocket launch, in the cold space environment, automatically expand significantly and reduce the surface pressure at the respective connection points and partially break the contact therebetween. Consequently, the thermal flow via these contact points is reduced or completely eliminated. The resulting reduction in rigidity of the attachment device can be adequate for use in the space environment if the connection points have been suitably designed. Alternatively, apart from the connection points, controlled by SMA elements, the attachment device can comprise additional continuously rigid attachment means which ensures adequate rigidity and maintenance of the tank alignment.

The decisive characteristic of SMA elements is the thermoplastic transformation from the high-temperature austenite state to the low-temperature martensite state. When such an element cools down, below a limit temperature $T_{MS}$, the formation of martensitic phases commences which is completed with further cooing at a temperature $T_{MR}$, at which attainment of the complete martensitic state is obtained. When heated from the martensitic state, above a temperature $T_{AR}$, the austenitic phase is formed. This transformation to the austenitic phase is fully complete when the temperature $T_{AR}$ is reached.

Thermomechanical training of the SMA elements results in a cyclic change in length both during heating and during cooling without any associated load: the so-called two-way effect. This training is necessary to achieve an additional change in length beyond the mechanical balance which is necessary for extension according to the invention, of the connection points of the attachment device. The entire achievable change in length of the SMA elements after carrying out thermomechanical training ranges from approximately 1.5% to 4%.

Preferably, the SMA elements are made from a NiTi-based alloy, but SMA alloys with a different composition can be used as long as they satisfy the transformation temperatures and changes in length according to the invention. In the case of NiTi-based alloys, for example, quaternary alloys such as NiTiCuFe or NiTiCuCr are used.

The composition of these alloys is selected such that the transformation temperature for completion of the austenite formation is $T_{AR}<0$ degree C., so that the SMA elements of the attachment device for the ambient temperatures during the launch phase, when the largest acceleration forces act upon the attachment device, are safely fully within the austenitic state. The final temperature for martensite formation $T_{MR}$ is set to a value above the temperature in space experienced by the attachment device, such temperature depending on the respective satellite emission; typically between 2° K and 220° K.

In the austenitic state, the SMA material according to the invention has a tensile strength of 700 MPa to 980 MPa and a modulous of elasticity of 80 GPa to 100 GPa and provides good mechanical properties so that if it is suitably dimensioned, it can easily resist and transmit the forces acting on the attachment device during rocket launch. In the martensitic state the material is relatively soft.

DETAILED DESCRIPTION

Figure 1:
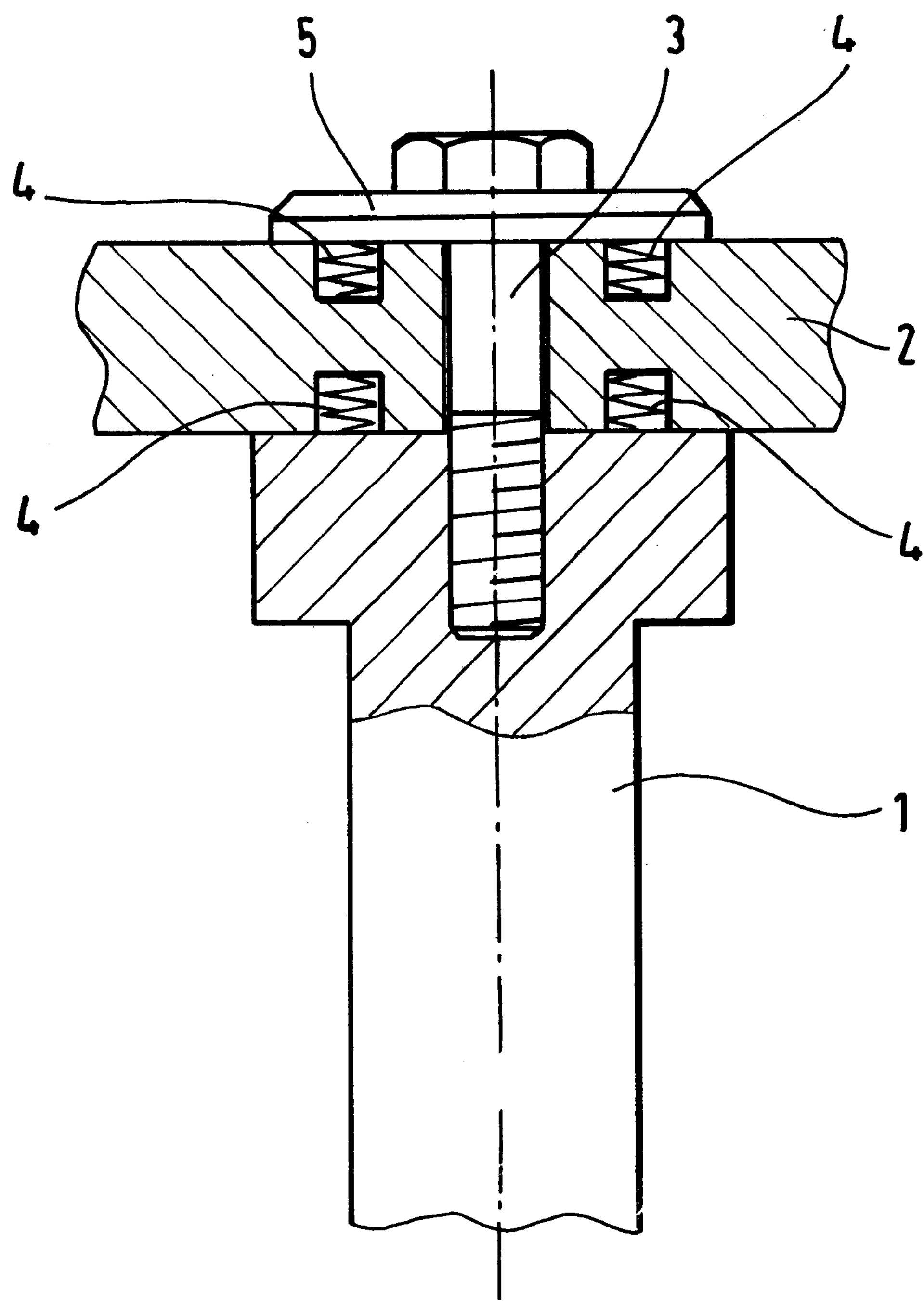
FIG. 1 illustrates an attachment device between a support element and a connecting component comprising an SMA bolt and pressure springs.

The connection between a satellite and a cryogenic tank is shown in FIG. 1 is obtained by an attachment device according to the invention which comprises a support element 1 attachable to a cryogenic tank (not shown), a connecting component 2 attachable to a satellite (not shown), an SMA element 3, compression springs 4 and a washer 5.

During cooling when in orbit in space, the SMA element 3 which is a bolt and the compression springs 4 inserted in recesses in the connecting component 2, separate the washer 5 from the connecting component 2, and separate the connecting component 2 from the end of the support element 1. After the elongation of the SMA element 3 occurs, thermal flow via this connection between the support element and the connecting component is reduced, due to the lack of surface pressure of direct contact between the end of the support element 1 and the connecting component 2 and between the connecting component 2 and the washer 5. Thermal flow now only takes place via the compression springs 4 and via lateral resting of the bolt in the drill hole. As a result of elongation of the bolt and the spring action, relative displacement of the support element 1 or of the connecting component 2 occurs; minimal forces can then only be transmitted via the connection between the support element and the connecting component by means of the compression springs 4 but this is of little significance in the zero gravity condition in outer space.

The support element 1 can for example be made as a stud or as a closed-off tube, with a threaded end for receiving the bolt 3. The connecting component 2 can, for example, be a flange of an attachment to the satellite. The washer 5 is interposed between the bolt head and the connection component so that compression springs 4 inserted in the connecting component 2 can act upon the washer. The compression springs 4 are coil springs and are inserted in both outer surfaces of the connecting component 2. Alternatively, other suitable compression springs can be used.

The connection between the support element and the connecting component as described above, provides the following advantages: an SMA element can be used which is simple to produce; the connection can be used with support elements of small diameter; the connection makes for simple installation and can transmit very substantial forces in the warmer, austenitic state.

Figure 2:
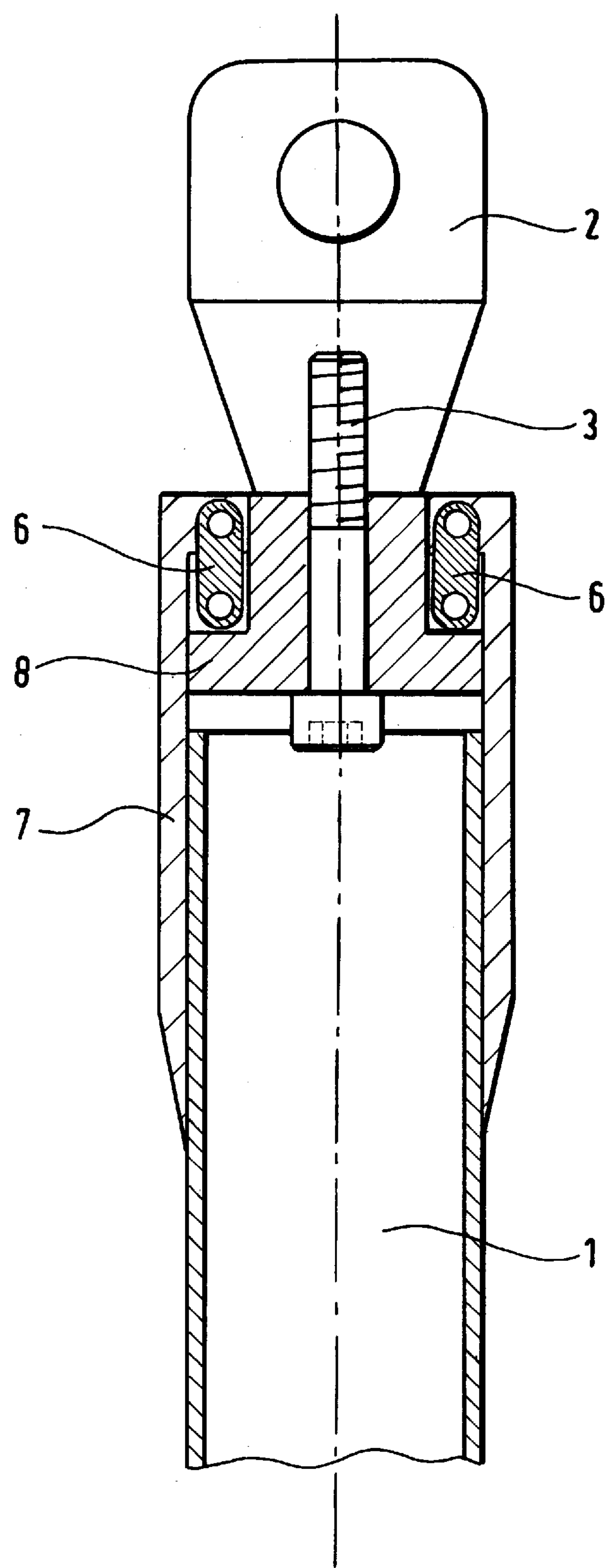
FIG. 2 illustrates, partly in section, another embodiment of an attachment device between a support element and a connecting component comprising an SMA bolt and additional SMA elements.

The connection between the support element and the connecting component, as shown in FIG. 2, comprises a support element 1, a connecting component 2, an SMA element 3, additional SMA elements 6, a connection sleeve 7 and an insert 8.

SMA element 3 which is a bolt, connects the insert 8 with the connecting component 2 and passes loosely through a hole in the insert 8. The insert 8 in turn is firmly connected to the connection sleeve 7 by means of the additional SMA elements 6. The additional SMA elements 6 are, for example, configured as stays and are fastened at their ends by means of screws or rivets respectively to the connection sleeve 7 and the insert 8. The support element 1 which is in the form of a hollow tube is secured in the connection sleeve 7 by means of an adhesive or by a shrink-fit.

In the warmer, austenitic state, the support element 1 and the connecting component 2 are firmly connected by the bolt 3 and the stays 6. During cooling, the bolt 3 made of SMA, and the stays 6 also made of SMA material, elongate. Consequently, the bolt head moves away from component 2 and insert 8 is separated from component 2. The thermal flow can then only take place via the supporting points of the bolt in the hole in insert 8.

In the cooled state this connection cannot transfer any forces, and in order to maintain attachment of the cryogenic tank to the satellite, the attachment device includes the sleeve 7 and stays 6 as additional connections between the support element 1 and the connecting component 2, which connections also provide fastening and transmission of forces in the cooled state.

In the connection between the support element and the connecting component described above in relation to FIG. 2, advantageously simple to produce SMA elements can be used. The normal conventional support elements can be used and in the warmer austenitic state, very substantial forces can be transmitted.

Figures 3, 3A:
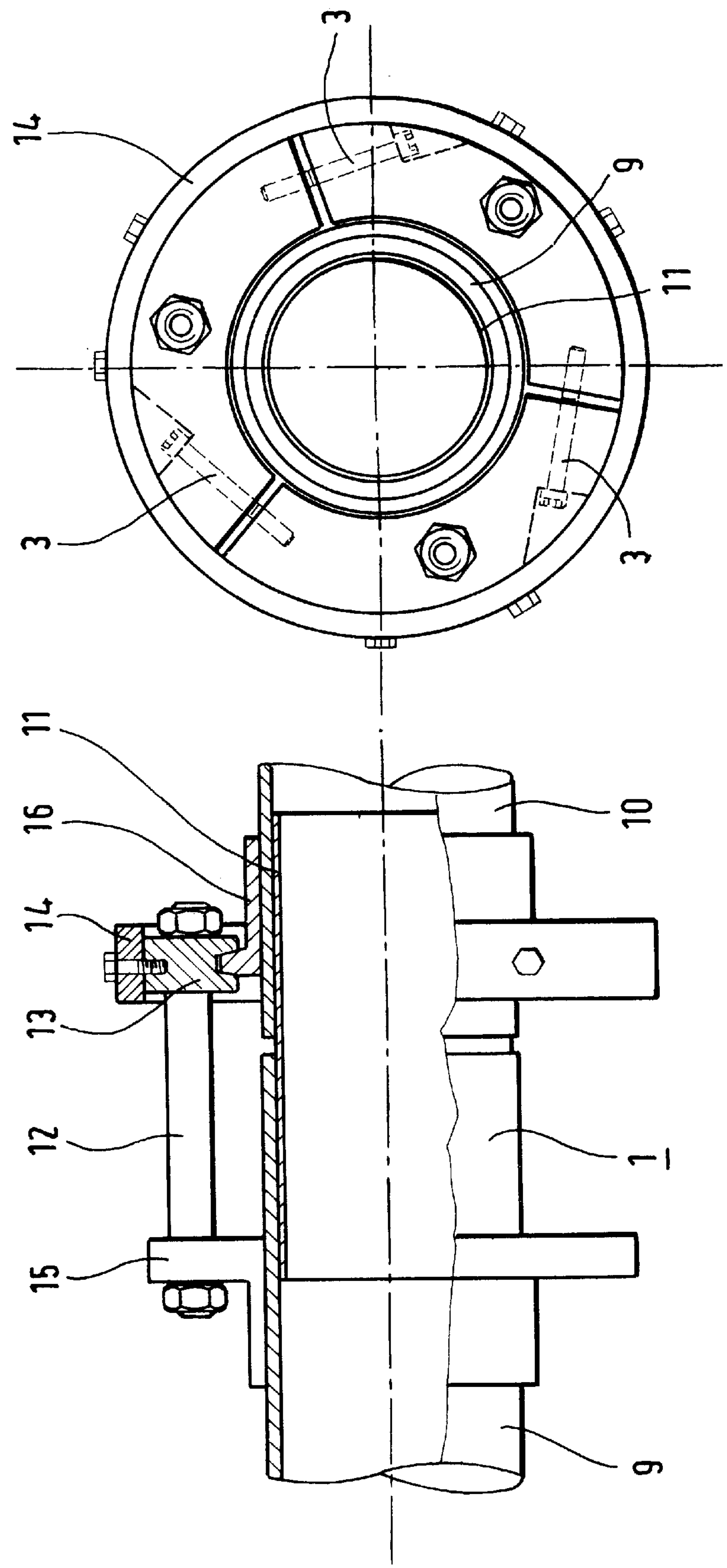
FIG. 3 is a side view illustrating, partly in section, a further embodiment of an attachment between a support element and a connecting component comprising a divided support element and a stud bolt connection with SMA elements.
FIG. 3*a* is an end view of the embodiment of FIG. 3.

FIG. 3 shows a connection between the support element formed in two sections and the connecting component in which the connection between the support element and the connecting component has the thermally controllable connection point located within the support element 1 and comprises a stud bolt connection. The connecting component 2 is connected in a conventional way to one of the support element sections. For reasons of simplicity, FIG. 3 does not show the connecting component 2 and the connection of the connecting component to the support section.

In FIG. 3, the support element 1 comprises two support element sections 9 and 10 of tubular shape which are axially spaced from one another. The attachment device of FIG. 3 includes a bridging element 11, several stud bolts 12, a stud bolt sleeve 15, a clamping ring 13, a split taper socket 16, an SMA ring 14 and SMA elements 3.

The stud bolt sleeve 15 is fastened, on one of the support element sections (section 9 in the illustrated embodiment) while the split taper socket 16 is fastened on the other support element section (section 10), for example, by means of an adhesive or by a shrink-fit. By means of a conical tongue and groove connection the split taper socket 16 accommodates the clamping ring 13 such that in its clamped state ring 13 is secured in axial direction on the support element section 10. Clamping of the clamping ring 13 is effected by the SMA elements 3 which are constituted as bolts, which cause the individual sections of the clamping ring to contract. The clamping ring 13 has drill holes through which one of the threaded ends of the stud bolts 12 protrude. The other end of the stud bolts 12 is attached in a respective drill hole in the stud bolt sleeve 15. A nut is screwed onto the end of each of the stud bolts 12 which protrudes from the clamping ring 13. In this way the stud bolt connection is tightened.

In addition to the stud bolt connection, the two support element sections 9 and 10 are fastened to each other by a bridging element 11. The bridging element 11 is characterized in that its thermal conductivity is less than that of the stud bolt connection, and that it can also transmit only smaller loads than the stud bolt connection. The three elements of the clamping ring 13 are connected to the SMA ring 14 via attachment bolts.

During cooling in space, the SMA elements 3 which are configured as bolts, elongate, and the SMA ring 14 widens. Consequently, the conical tongue and groove connection between the clamping ring 13 and the split taper socket 16 evenly and completely disengages, thus considerably reducing any thermal flow, via the stud bolt connection, between the support element sections 9 and 10.

This connection provides the advantage that it can transmit very substantial forces in the warmer austenitic state.

In the embodiment shown, by way of example, three stud bolts are evenly distributed around the circumference of the stud bolt connection. An alternative number of stud bolts, form one or more can be provided, according to the invention.

Figure 4:
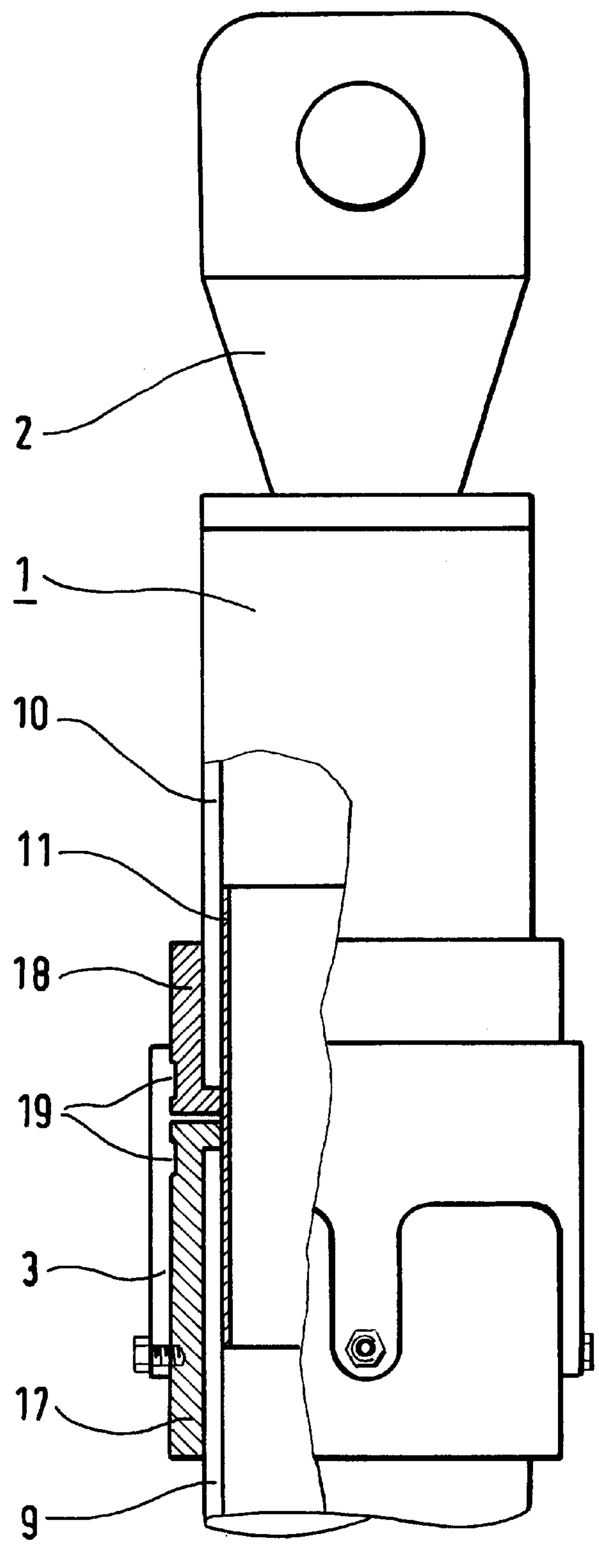
FIG. 4 illustrates, partly in section, a further embodiment of an attachment device between a support element and a connecting component comprising a divided support element which is held together by an SMA split taper socket.

The connection between the support element and the connecting component shown in FIG. 4 also comprises a thermally controllable connection point which is completely situated within the support element 1. The connecting component 2 is firmly connected to one of the support element sections in a conventional way.

The thermally controllable connection between the support element and the connecting component comprises the two support element sections 9 and 10 of tubular support element 1 which is interrupted at the connection point, a bridging element 11, an SMA element 3 configured as a split taper socket, and two snap ring sleeves 17 and 18.

The snap ring sleeves 17 and 18 are fastened to the ends of the support element sections 9 and 10 by means of an adhesive or a shrink-fit or other suitable means. On one of the snap ring sleeves (sleeve 17 in this embodiment), the SMA element 3 in the form of a split taper socket, is fastened by bolts such that element 3 protrude from the end of the respective support element section 9. On the interior surface of the socket the SMA element 3 comprises two axially spaced annular projections 19 which when support element sections 9 and 10 are assembled, protrudes in respectively arranged grooves on the fastened snap ring sleeves 17 and 18, thus forming a tongue and groove connection on each support element section. When the connection is established the SMA element 3 must temporarily be elongated by cooling to allow the projections 19 to engage in the grooves.

In addition, the two support elements 9 and 10 are fastened to each other by bridging element 11. The bridging element 11 is characterized in that its thermal conductivity is less than that of the split taper socket and that it can transmit only smaller loads than the split taper socket.

During cooling in space, the SMA element 3 in the form of the split taper socket, widens. Consequently, the connection between the SMA element 3 and the snap ring sleeves 17 and 18 disengages, thus considerably reducing any thermal flow via the split taper socket, between the support element sections 9 and 10.

Figure 5:
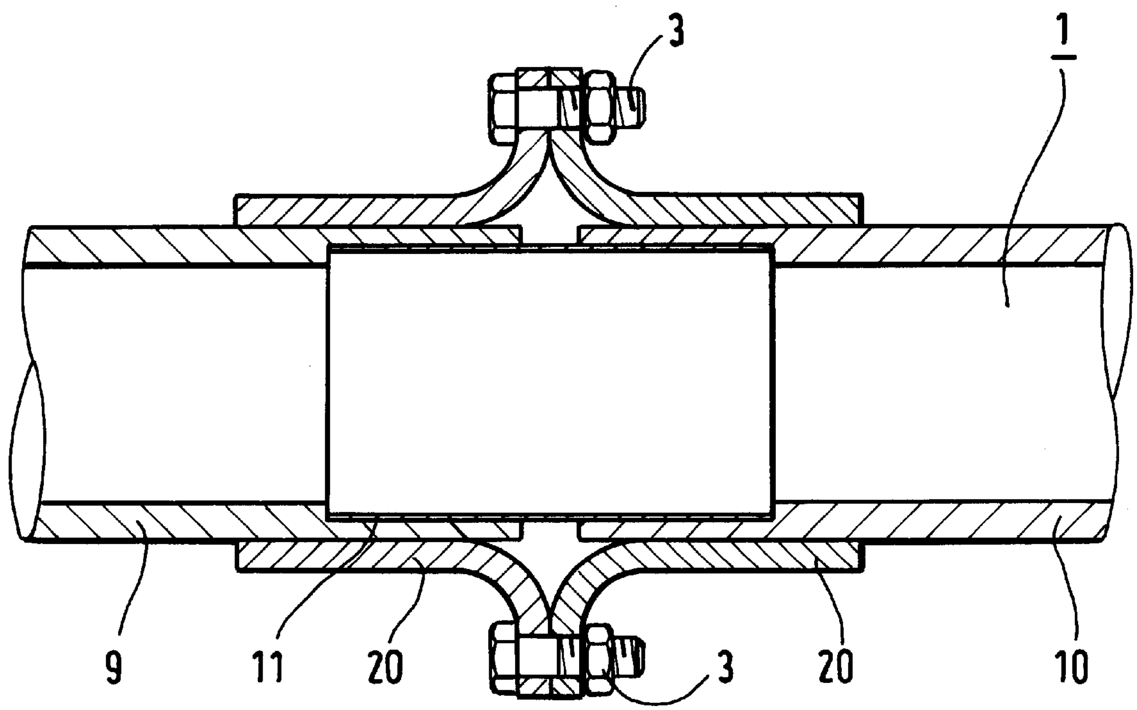
FIG. 5 illustrates, partly in section, another embodiment of an attachment device between a support element and a connecting component with a divided support element comprising an SMA bolt connection.

FIG. 5 shows a connection between the support element and the connecting component, whose controllable connection point is completely associated with the support element 1, as is the case in the two previously described embodiments. The connecting component 2 is firmly connected in a conventional way to one of the support element sections (e.g. section 9 in this embodiment). For reasons of simplicity this is not shown.

The thermally controllable connection of the connection between the support element and the connecting component 1 comprises the two support element sections 9 and 10 of tubular support element 1 interrupted at the point of connection, bridging element 11, two connection sleeves 20 and two SMA elements 3 in the form of bolts. As an alternative, it is also possible to use more than two SMA elements 3.

At the outer ends of the support element sections 9 and 10 to be connected, the connection sleeves 20 are fastened by an adhesive or by shrink-fit or other suitable means. Towards the free end of the support element sections, the connection sleeves 20 are bent to form outward flanges and the flanges are provided with axially aligned drill holes. The SMA elements 3, in the form of bolts, are inserted through the drill holes and are secured by nuts. The support element sections 9 and 10 are secured by tightening the bolts and are pre-tensioned against the elasticity of the bent material. Fastening of the connection sleeves 20 to the support element sections 9 and 10 is such that without the tightened SMA elements 3 they do not have contact with each other at their flanges. Instead of the bent flanges, the flanges can be formed as separate flange elements secured to the sleeves.

During cooling in space, the SMA elements 3 in the form of bolts, elongate. Consequently, due to the elasticity produced by the pre-tensioned bent flanges, the contact between the ends of the flanges of the connection sleeves 20 is interrupted, thus considerably reducing thermal flow between the support element sections 9 and 10.

In the connection between the support element and the connecting component described above in respect of FIG. 5, SMA elements can be used which are simple to produce; the connection can be used in the case of support elements of small diameter, and simple installation is possible.

All the above embodiments described in FIGS. 3–5 are adequate on their own for maintaining fastening of a cryogenic satellite tank in space without the use of additional uninterrupted rigid attachment means. After cooling and thus the resulting loosening of the thermally controllable connection components, the rigidly fastened bridging elements 11 of the connections still provide sufficient dimensional stability.

The bridging element 11 can differ from the illustrated thin-walled tubes. For example, they can be formed as joints made of carbon fibre reinforced or glass fibre reinforced components. Alternatively, the connection between the support element sections could be established by plates bonded cross-like with respect to each other, in the axial direction.

As has already been mentioned above, SMA elements in the embodiments described above can be made from a NiTiCuFe alloy. The chemical composition of this alloy is selected such that at ambient temperatures down to 0 degrees C., a complete austenitic state is present, and that complete transformation from austenite to martensite is completed at temperatures in outer space—typically ranging from about 2° K to 220° K.

As has been described earlier, prior to their use, the SMA elements are subjected to thermomechanical training so as to achieve a two-way effect.

Although the invention is disclosed with reference to particular embodiments thereof, it will become apparent to those skilled in the art that numerous modifications and variations can be made which will fall within the scope and spirit of the invention as defined by the attached claims.

What is claimed is:

1. An attachment device for connecting a cryogenic tank to a satellite, said attachment device comprising a support element connectable to the tank, a connecting component connectable to the satellite, connection means for connecting the connecting component and the support element in pressure contact, said connection means including a part made of a shape memory alloy (SMA), said SMA part being in an austenitic state at ambient temperatures prior to launch of the satellite to hold said support element and said connecting component in clamping pressure contact with one another to resist forces at launch and keep the satellite and the tank securely connected, said SMA part undergoing change to martensitic state at low temperature in space after launch of the satellite to expand and loosen the connection between the support element and the connecting component to reduce contact surface area and clamping pressure therebetween thereby to reduce thermal flow from the satellite to the tank.

2. An attachment device as claimed in claim 1, wherein said connection means further comprises spring means for urging the support element and the connecting component away from one another as the SMA element undergoes expansion.

3. An attachment device as claimed in claim 2, wherein the connecting component has a recess in which said spring means is installed.

4. An attachment device as claimed in claim 2, wherein said SMA part comprises a bolt.

5. An attachment device as claimed in claim 4, wherein said bolt is threadably engaged with one of the support element and the connecting component, said connection means further comprising an insert through which said bolt passes, said bolt having a head engaged against said insert, and means connecting the insert and the other of the support element and the connecting component.

6. An attachment device as claimed in claim 5, wherein said means connecting the insert and the other of the supporting element and the connection component comprises stay elements fixed to said insert and said other of the support element and the connection component, and further SMA parts in said stay elements.

7. An attachment device as claimed in claim 6, wherein said means connecting the insert and the other of the supporting element and the connecting component further comprises a sleeve fixed to said other of the support element and the connecting component and to one of the ends of said stay elements, the other of the ends of said stay elements being fixed to said insert, said further SMA elements providing separation between said insert and said other of the support element and the connecting component when the further SMA elements go from the austenitic state to the martensitic state.

8. An attachment device as claimed in claim 7, wherein said support element comprises a tube separated into said two sections, said connecting component being connected to one of said sections, a bridging element rigidly connecting said two sections to one another independently of said connection means, said bridging element having lower thermal conductivity than said connection means, said SAM part enabling said connection means to transit larger forces between said tube sections than can the bridging element.

9. An attachment device as claimed in claim 8, wherein said connection means further comprises a thermally controlled connection including said SAM part, said thermally controlled connection comprising an axially acting stud bolt connection including a stud bolt sleeve attached to a first support for rigid accommodation of at least one stud bolt, constituting said SMA part of a split taper socket attached to the second support section for accommodation of at least one clamping ring having a conical tongue and groove connection and through holes for accommodation and threaded attachment of free ends of the stud bolt to contract the clamping ring, and an SMA ring connected between the other support section and the connecting component such that during cooling the SMA ring expands and the SMA part elongates and the conical tongue and groove connection between the clamping ring and the split taper socket is separated.

10. An attachment device as claimed in claim 8, comprising a thermally controlled connection between the support sections comprising a split taper socket connection having a first snap ring sleeve attached to a first support section, a second snap ring sleeve attached to the second support section, said SMA part being configured as a split taper socket fastened to one of the snap ring sleeves and in the assembled state of the support sections engaging snap ring grooves in the snap ring sleeves by means of projections on the socket, said SMA part, during cooling, separating the projections from the snap ring sleeves, due to widening.

11. An attachment device as claimed in claim 8, comprising a thermally controlled connection between the support sections comprising an axially acting screw connection having a connection sleeve attached to each of the support element sections and including bent ends forming radial flanges, said flanges having holes for axial accommodation of bolts constituting said SMA part such that during cooling due to elongation of the bolts the connection is loosened and pre-tensioned faces of the bent flanges are separated from each other.

12. An attachment device as claimed in claim 4, wherein said bolt is threadably connected to said support element to press said support element and said connecting component together, said bolt providing thermal flow between said support element and said connecting component.

13. An attachment device as claimed in claim 12, wherein said connecting component has a recess offset from said bolt in which said spring means is supported.

14. An attachment device as claimed in claim 12, wherein said connection means further comprises a washer interposed between said connecting component and a head of said bolt, said connection component having a recess therein facing said washer, said spring means comprising a spring in said recess acting between the washer and the connecting component.

15. An attachment device as claimed in claim 14, wherein said connecting component has a further recess facing said support element, said spring means further comprising a further spring in said further recess acting between said support element and said connecting component.

16. An attachment device as claimed in claim 15, wherein said recess and said further recess are offset from said bolt.

17. An attachment device as claimed in claim 1, wherein said support element comprises two sections one of which is connectable to said connecting component, said connection means connecting said two sections together.

18. An attachment device as claimed in claim 1, wherein said shape memory alloy comprises NiTiCuFe, said alloy being thermomechanically trained to provide a two-way effect in which during heating fully complete transformation to austenite at temperatures above 0 degrees C.; and during cooling fully complete transformation to martensite at the temperature in space.

* * * * *